United State [11] 3,741,627

Haertling et al. [45] June 26, 1973

[54] STRAIN BIASED FERROELECTRIC ELECTRO-OPTICS

[75] Inventors: Gene H. Haertling; Cecil E. Land; Ira D. McKinney, all of Albuquerque, N. Mex.

[73] Assignee: The United States of America as represented by the United States Atomic Energy Commission, Washington, D.C.

[22] Filed: Dec. 1, 1971

[21] Appl. No.: 203,723

[52] U.S. Cl................. 350/150, 350/157, 350/160
[51] Int. Cl. ............................................. G02f 1/26
[58] Field of Search................... 350/147, 149, 150, 350/157, 160, 161; 340/173.2, 173 SS

[56] References Cited
UNITED STATES PATENTS

| | | | |
|---|---|---|---|
| 3,663,088 | 5/1972 | Maldonado et al. | 350/150 |
| 3,517,200 | 6/1970 | Kalman | 350/150 |
| 3,560,955 | 2/1971 | Hallman | 350/149 |
| 3,659,270 | 4/1972 | Maldonado et al. | 350/149 |
| 3,666,666 | 5/1972 | Haertling | 350/150 |
| 3,600,611 | 8/1971 | Treharne | 350/149 |
| 3,437,399 | 4/1969 | Eden | 350/149 |

Primary Examiner—David Schonberg
Assistant Examiner—Michael J. Tokar
Attorney—Roland A. Anderson

[57] ABSTRACT

An electrooptic birefringent device and apparatus using the same including a ferroelectric ceramic plate, which is capable of exhibiting electrically induced birefringence effects, rigidly mounted on a ferroelectric structure, means for electrically inducing a dimensional change in said piezoelectric structure to produce a uniaxial stress in said ceramic plate in a direction parallel to the major surfaces of said plate, and means for thereafter applying electric fields between the major surfaces of the ceramic plate to effect birefringence changes therein.

8 Claims, 5 Drawing Figures

PATENTED JUN 26 1973　　　　　　　　　　　　　　　3,741,627

INVENTORS
GENE H. HAERTLING
CECIL E. LAND
IRA D. McKINNEY
BY

STRAIN BIASED FERROELECTRIC ELECTRO-OPTICS

BACKGROUND OF INVENTION

Ordinarily, an optical quality, ferroelectric ceramic plate which is capable of electrically induced birefringence effects of the type described in U.S. Pat. No. 3,531,182 to Cecil E. Land and Donald G. Schueler for "Multi-Remanent Ferroelectric Ceramic Optical Devices," is optically isotropic in the plane normal to the poling or switching direction. As a consequence, prior electrically induced birefringent ferroelectric ceramic devices generally used a transverse mode, that is a switching of polarization levels, and consequently birefringent levels, in a direction parallel to the major surfaces of the ferroelectric ceramic plate and perpendicular to the direction of incident light, to provide the necessary anisotropy to indicate polarization changes by corresponding changes in birefringence. Devices have now been made in which these ferroelectric ceramic plates are physically strained in tension along an axis having a direction parallel with the major surfaces of the plate which results in a condition of uniaxial birefringence. With such a condition, the ferroelectric ceramic plate may then be poled in a direction perpendicular to the major surfaces thereof to different levels of polarization to change the birefringence from an initial birefringence level to a plurality of stable birefringence levels. In these prior devices, the desired strain was produced by bonding the ferroelectric ceramic plate to a substrate and then bending the substrate about an axis perpendicular to the desired strain direction. These so bent, ferroelectric ceramic plates exhibited birefringence changes from one saturation remanent level to a zero remanent polarization level of about 0.003. The provision of such strain biasing by this mechanism often produced non-uniform strains within the materials due to limitations in bonding techniques and other factors which adversely affect the optical properties of the devices and often resulted in light scattering and depolarization of light in the ferroelectric ceramic plate. In addition, generally, the ferroelectric ceramic plate is subject to damage or destruction from these strains, especially as the plates are generally no greater than a few mils in thickness and very brittle in nature. Other strain biasing has been achieved in an arrangement described in copending application Ser. No. 203,726 to Cecil E. Land and Willis D. Smith for Self Strain Biased Ferroelectric Electrooptics, filed on the same date as this application.

Since the changes in birefringence are achieved by electrical fields produced between the major surfaces of the plate and in the same direction as incident light, the operation is termed a "longitudinal mode" type of operation. Such operation is desirable as it permits switching with relatively low amplitude voltages and permits controlling of large areas or apertures of material with the same low voltages and fields.

SUMMARY OF INVENTION

In view of the above, it is an object of this invention to provide a new, strain bias electrooptic device and method of achieving the same.

It is a further object of this invention to provide a strain biased device which exhibits large variations of birefringence.

It is a still further object of this invention to provide a method of strain biasing of a ferroelectric ceramic plate which is both simple and reliable in operation.

Various other objects and advantages will appear from the following description of the invention and the most novel features will be particularly pointed out hereinafter in connection with the appended claims. It will be understood that various changes in the details, materials and arrangements of parts, which are herein described and illustrated in order to explain the nature of the invention, may be made by those skilled in the art.

The invention comprises rigidly mounting a ferroelectric ceramic plate capable of electrically induced birefringence effects to a piezoelectric supporting structure, applying an electric field to said piezoelectric structure to change dimensions thereof and to apply a uniaxial stress to the ferroelectric ceramic plate in a direction parallel to major surfaces thereof, and thereafter applying other electric fields between said major surfaces of said plate to vary the birefringence of said plate in the direction of the electric field.

DESCRIPTION OF DRAWING

The invention is illustrated in the accompanying drawings wherein.

DETAILED DESCRIPTION

Figure 1:
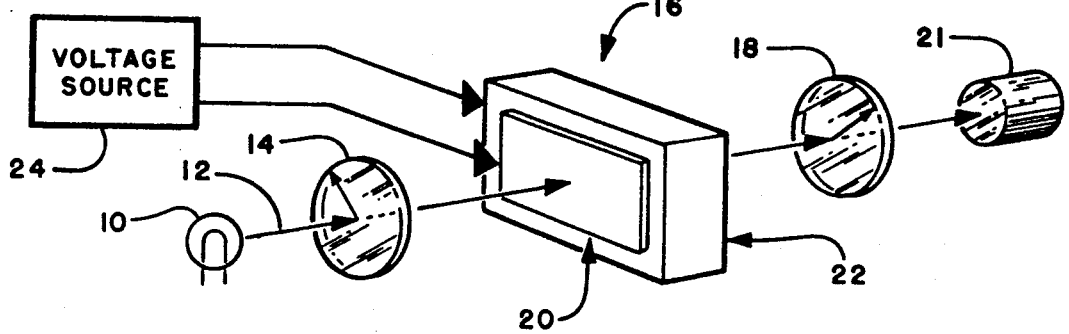
FIG. 1 is a perspective view showing an electrooptic arrangement with an electrooptic device with ferroelectric ceramic plate constructed in accordance with this invention.
Figure 2:
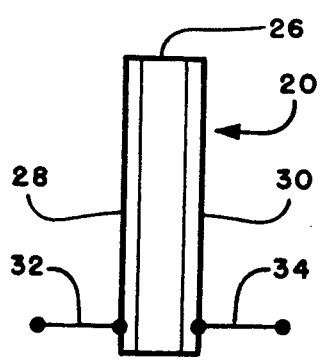
FIG. 2 is an expanded side view of the ferroelectric ceramic plate used in FIG. 1.

The ferroelectric ceramic, electrooptic device of this invention may be used in the somewhat simplified optical arrangement or apparatus shown in FIG. 1. In this arrangement, the monochromatic or white light source 10 may be positioned so as to direct a light beam 12 through a linear polarizing element 14, and electrooptic device 16 made in accordance with this invention, an analyzer 18 (that is, a second polarizer oriented with its polarizing angle at 90° with respect to polarizer 14) and a photosensitive and/or utilization device 21. The electrooptic device 16 may include a ferroelectric ceramic member 20 which is capable of exhibiting electrically induced variable birefringence effects suitably mounted on and supported by a ferroelectric and piezoelectric structure 22. The ferroelectric ceramic member 20 and ferroelectric and piezoelectric structure 22 may be suitably controlled as described above to effect the desired birefringence and birefringence changes within member 20 by use of an appropriate power supply and controlling circuit or voltage source 24.

The ferroelectric ceramic member 20 is formed from a ferroelectric ceramic plate 26 of appropriate solid solution composition having transparent electrodes 28 and 30 disposed or deposited on its major surfaces. The ferroelectric ceramic member 20 for each of the embodiments shown will be of this same general configuration. It will be understood that one or the other of the electrodes 28 and 30 may be segmented into a plurality of separate electrodes appropriately positioned on ferroelectric ceramic plate 26 and that one or more photoconductive layers may be disposed between one or the other of the electrodes and the ferroelectric ceramic plate 26 to provide electrical or optical selective addressing of portions of plate 26.

The ferroelectric ceramic plate 26 is made from a ferroelectric ceramic, mixed oxide or chemically prepared solid solution which has been formed by a suitable hot-pressing and other techniques to be of optical quality internally and on its major, oppositely disposed and generally parallel surfaces. In most applications, the major surfaces of the ceramic plate will be parallel but may be otherwise where such is desired. Typical materials and solid solution compositions of lead zirconate titanate with various additives or substituents are described in copending application Ser. No. 885,789 by Gene H. Haertling for "Ferroelectric Ceramic Materials," filed Dec. 17, 1969, now U.S. Pat. No. 3,666,666 issued May 30, 1972, and the above-referred to U.S. Pat. No. 3,531,182. The desirable materials exhibit a generally rectangular polarization vs electric field hysteresis loop and may be electrically polarized to stable saturation remanent levels as well as stable remanent polarization levels between saturation remanence and zero polarization. The particular polarization or remanent polarization level at which the ferroelectric ceramic plate 26 is at may be selected by proper application of electric fields controlling the amplitude, duration and polarity thereof. Such electric fields may be applied to ferroelectric ceramic plate 26 longitudinally therethrough and between the major surfaces thereof by voltage source 24 through electrical terminals 32 and 34.

The ferroelectric ceramic plate 26 may typically be from about 1 to 20 mils in thickness with transparent electrodes of such as indium oxide or tin oxide of about 1,000 angstroms thickness. The ferroelectric and piezoelectric structure 22, on the other hand, may be of considerably greater thickness, such as about 5 to 200 mils, the overall area of the respective member 20 and structure 22 encompassed thereby being dependent on the use to be made of the device and fabrication and other considerations.

The ferroelectric and piezoelectric structure 22 is generally formed of a material which has a sufficiently large piezoelectric and/or electrostrictive strain to produce the desired strain in the ferroelectric ceramic plate 26, e.g., a piezoelectric constant of about 50 to 600 or more and preferably greater than $150 \times 10\Delta^{12}$ coulombs/newton. Structure 22 may thus be formed from any conventional ferroelectric crystals or ceramic materials which exhibit poling strains between 1 and 3 $\times 10^{-3}$. Structure 22 is subjected to a voltage from voltage source 24 of appropriate amplitude and polarity between some dimensions of structure 22 which will cause the piezoelectric to contract or expand in that dimension. When the piezoelectric structure 22 expands or contracts in one dimension (the thickness or longitudinal direction) it generally contracts or expands respectively, in dimensions in a plane perpendicular thereto (planar or transverse directions). For example, if structure 22 is expanded in the thickness dimension, it will contract in the width and length dimensions, e.g.,
it will change dimensionally differently in planes perpendicular to each other. With ferroelectric member 20 appropriately mounted and attached to structure 22, member 20 may be subjected to desired stresses. In this electrooptic device, it is desirable that member 20 be subjected to a uniaxial stress in a plane parallel to the major surfaces of the ferroelectric ceramic plate 26.

Figure 3:
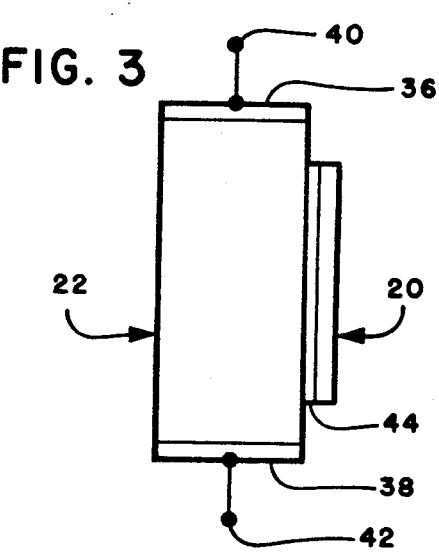
FIG. 3 is an exaggerated side view showing one embodiment of an electrooptic device usable in the arrangement of FIG. 1.

As shown in FIG. 3, structure 22 may be provided with electrodes 36 and 38 along two of the parallel edges thereof. When an electric field is produced between these electrodes by voltage applied to terminals 40 and 42 by voltage source 24, structure 22 will elongate in the direction of the electric field. If ferroelectric member 20 is fastened or fixedly secured against a major surface of structure 22, as shown, using an adhesive or the like bonding layer 44 over an entire major surface of member 20, ferroelectric ceramic plate 26 will be subjected to a uniaxial tensile strain in the same direction as the electric field. This strain produces a strain bias in member 20 and produces the desired anisotropy in the plane of the ceramic plate 26. This anisotropy produces a birefringence level which is dependent on the amount of strain to which the plate 26 is subjected and the material of which plate 26 is made. The birefringence level may then be changed to varying levels by polarizing ferroelectric ceramic plate 26 to different levels of polarization in the longitudinal direction by appropriate voltage biases applied to electrodes 28 and 30. Thus, the maximum level of birefringence which ferroelectric ceramic plate 26 may exhibit in the longitudinal direction may be adjusted by selection of appropriate biasing fields for piezoelectric structure 22 which may then be changed to any desired level, and even to zero, by proper application of voltage biases to electrodes 28 and 30 of ferroelectric member 20. Birefringence levels of $-0.005$ may be achieved with changes therein of from about 0.005 to 0.010.

Figure 4:
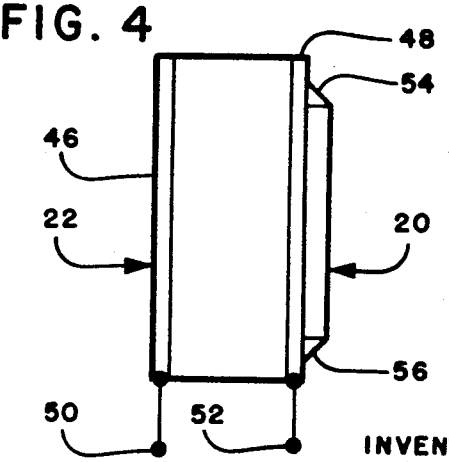
FIG. 4 illustrates another embodiment of the an electrooptic device.

A similar operation may be achieved by disposing or depositing transparent electrodes 46 and 48 on the major surfaces of structure 22 in a manner shown in FIG. 4 which, with terminals 50 and 52, may be used to apply an electric field to structure 22 in the longitudinal direction. Such an electric field will cause structure 22 to elongate in the longitudinal direction and to contract in transverse directions. Ferroelectric member 20 may be mounted or fixedly secured on electrode 48 of structure 22 by rigidly fastening any two parallel edges of member 20 thereagainst with an appropriate adhesive or bonding strips 54 and 56. In such an arrangement, the electrode of member 20 which faces structure 22 may be eliminated, if such is desired, and electrode 48 used as the second electrode for member 20. With the strain applied to structure 22 by the electric field, member 20 will also be subjected to a strain, and since it is bonded along two parallel edges the strain will be uniaxial and will produce the desired longitudinal birefringence effects.

It will be apparent, that the strain within member 20 and the longitudinal birefringence thereof may exist during the period of time when an electric field is applied in the appropriate direction through structure 22 or when the material of structure 22 is in some remanent polarization state. If it is desired, the structure 22 may be subjected to the appropriate electric field without member 20 mounted thereagainst and the member rigidly fastened thereto while structure 22 is so deformed. When the electric field is then removed from the electrodes of structure 22, structure 22 will return to its normal shape and provide a strain bias in ferroelectric member 20 of the desired uniaxial type.

Figure 5:
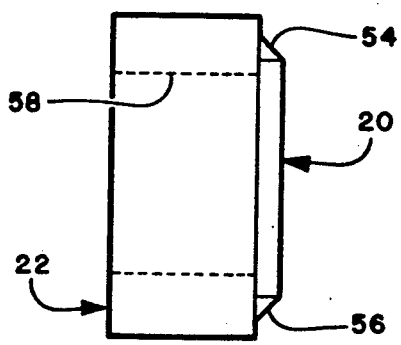
FIG. 5 shows still another electrooptic device embodiment usable in the arrangement of FIG. 1.

With the embodiments shown in FIGS. 3 and 4, it has been assumed that the respective materials in the path of light beam 12, that is the various electrodes, ferroelectric materials, adhesive bonds and the like were substantially optically transparent. A piezoelectric structure 22 may be used which has the desired piezoelectric characteristics but which is not optically transparent by providing a window or passageway 58, as shown in FIG. 5, therethrough communicating with a substantial portion of ferroelectric member 20. Ferroelectric member 20 may be bonded to this embodiment of structure 22 in the same manner as either FIGS. 3 or 4 embodiments together with the appropriate electrodes on structure 22.

In the embodiments shown, the strains in the ferroelectric member 20 are generally uniaxial and uniform. This strain results in producing generally uniform strain birefringence throughout the ferroelectric ceramic plate which, in turn, results in the desired longitudinal electrooptic effects. In each embodiment, the biasing strain in the electrooptic ceramic plate is controlled by the poling or switching voltage being applied to the piezoelectric substrate and the birefringence of the ferroelectric ceramic plate 26 is controlled by appropriate biases applied to transparent electrodes 28 and 30.

What is claimed is:

1. A device for use in an electrooptic apparatus comprising a ferroelectric ceramic element including a ferroelectric ceramic electrooptic plate having generally oppositely disposed optical quality surfaces, said ferroelectric ceramic electrooptic plate being a solid solution exhibiting electrically induced birefringence effects, an optically transparent electrode disposed on one of said optical quality plate surfaces, and electrode means disposed on the other of said optical quality plate surfaces for producing with said transparent electrode longitudinal electric fields through said ferroelectric ceramic plate; a ferroelectric ceramic substrate having high piezoelectric constant and high poling strain which effects changes in dimension under electric poling and switching fields; means for fixedly securing said ferroelectric ceramic substrate to said ferroelectric ceramic element along portions of said element for effecting uniaxial strains in said ferroelectric ceramic electrooptic plate as said substrate changes dimensions; and means for applying poling and switching fields to said ferroelectric ceramic substrate for dimensionally changing thereof in a selected direction and for effecting a uniaxial change in dimension of said ferroelectric ceramic electrooptic plate in planes parallel to said optical quality surfaces in response to said dimension change of said substrate to produce birefringence in said ferroelectric ceramic electrooptic plate.

2. The device of claim 1 wherein said ferroelectric ceramic plate and said ferroelectric ceramic substrate are substantially coextensive.

3. The device of claim 1 wherein said electrode means is a second optically transparent electrode disposed on said other optical quality surface of said ferroelectric ceramic electrooptic plate.

4. The device of claim 1 including means for applying an electric field to said electrode means and said transparent electrode of said ferroelectric ceramic element when said ferroelectric ceramic electrooptic plate dimensions are changed; means for applying polarized light to one of said surfaces of said ferroelectric ceramic plate; and means for sensing changes in birefringence to said ferroelectric ceramic plate.

5. The device of claim 1 wherein said ferroelectric ceramic substrate is substantially optically transparent.

6. The device of claim 1 wherein said ferroelectric ceramic element is fixedly secured by said securing means throughout a substantial portion of one of said optical quality surfaces to said ferroelectric ceramic substrate.

7. The device of claim 1 wherein said ferroelectric ceramic element is fixedly secured along two parallel edges thereof to said ferroelectric ceramic substrate by said securing means.

8. The device of claim 1 wherein said ferroelectric ceramic substrate includes a passageway therethrough in alignment and communication with said ferroelectric ceramic plate.

* * * * *